United States Patent [19]

Kowal

[11] Patent Number: 4,536,984
[45] Date of Patent: Aug. 27, 1985

[54] RETRIEVAL DEVICE FOR FISHING TACKLE

[76] Inventor: Leon Kowal, 15 Illingworth St., Canberra, Australia, 2903

[21] Appl. No.: 580,422

[22] Filed: Feb. 15, 1984

[30] Foreign Application Priority Data

Feb. 18, 1983 [AU] Australia ............................. PF8386
Feb. 23, 1983 [AU] Australia ............................. 13537/83

[51] Int. Cl.³ ............................................. A01K 97/00
[52] U.S. Cl. ..................................................... 43/17.2
[58] Field of Search .................................... 43/17.2, 5

[56] References Cited

U.S. PATENT DOCUMENTS

| 2,609,632 | 9/1952 | Davis | 43/17.2 |
|---|---|---|---|
| 2,800,738 | 7/1957 | Allman | 43/17.2 |
| 3,570,163 | 3/1971 | Conder | 43/17.2 |
| 3,693,277 | 9/1972 | Wells | 43/17.2 |
| 3,805,435 | 4/1974 | Serrill | 43/17.2 |
| 4,155,190 | 5/1979 | McInturff | 43/17.2 |

*Primary Examiner*—Gene P. Crosby
*Attorney, Agent, or Firm*—Linval B. Castle

[57] ABSTRACT

A device for retrieving fishing tackle e.g. lines is described. The retriever has a weighted elongated body portion comprising a forward portion and a rearward portion. An attachment member is provided at the rearward portion for connection to a retriever line. A pair of forwardly converging limbs extend from the forward portion and terminate in an upwardly directed closed loop to receive a snagged fishing line. A rear guide member is provided on the upper rearward portion of the weighted body for receiving and being guided by the snagged line. The weighted body has a longitudinal groove which is in line with the rear guide member and the upper portion of the closed loop to permit close guiding by the snagged line.

2 Claims, 4 Drawing Figures

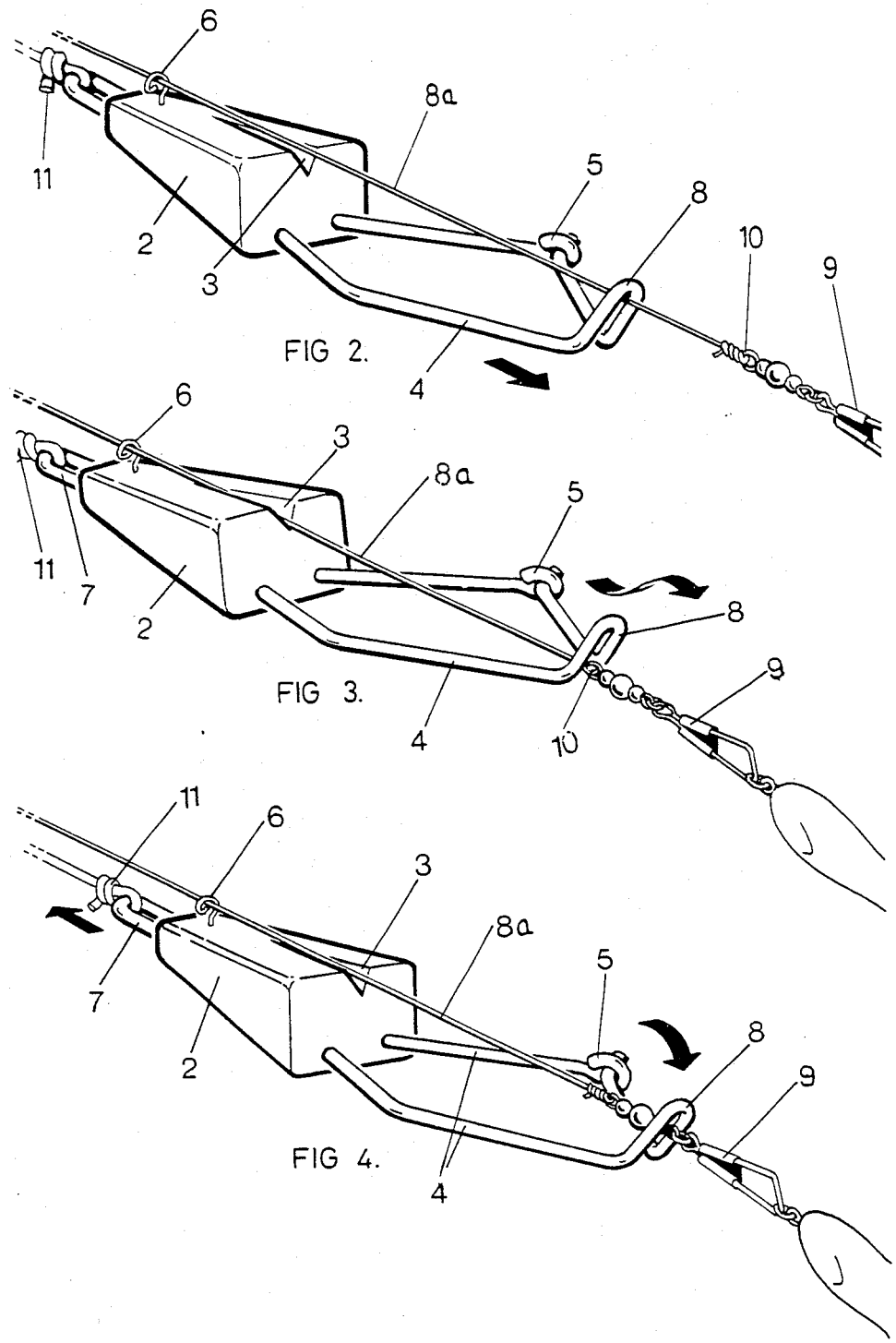

RETRIEVAL DEVICE FOR FISHING TACKLE

FIELD OF THE INVENTION

This invention relates to a retrieval device for fishing tackle especially for lures but also for sinkers and the like.

When fishing, and especially when casting or trolling, the fishing hook frequently becomes snagged by weeds, logs, rocks and like objects. Freeing of the snagged line, either by pulling or other means usually results in the line breaking with the consequent loss of the hook and associated lure. As lures are becoming increasingly expensive a need exists for retrieving lures when they become snagged.

DESCRIPTION OF THE PRIOR ART

Australian Patent Application No. 65927/80 describes and claims a lure retriever comprising an annular member of generally tear-drop shape, both in inner and outer peripheral outline plan view, the inner periphery defining an open area for a fishing line to pass therethrough and of sufficient size to pass over a fishing lure to be retrieved that is attached to a snagged hook, and a slot in said member for inserting the fishing line into said area, one end of said member being pointed providing a V-notch to engage the snagged hook or connecting line beyond the lure and the opposite end being rounded.

U.S. Pat. No. 2,800,738 to A. D. Albman discloses a retriever for a fish lure caught on an object below water surface. The retriever has a stiff closed loop for enclosing the fishing line and in which the loop is broader at the base than at the top thereof, whereby to encompass a member on the line near the lure via the base of the loop but to latch onto it by the narrower portion at the top. The retriever is basically a weight with the stiff closed loop extending forwardly and upwardly therefrom and having a guide loop for the line rearwardly thereof. In use, the weight is suspended below the fishing line.

U.S. Pat. No. 3,570,163 to A. C. Conder discloses a retriever for a fishing line in which a weighted body member has a pivotally mounted loop at each end. A spring arm projects forwardly of the body to terminate in a looped striking head rearwardly and upwardly inclined at an acute angle to the forward direction. In use, a fishing line is received by the three loops for guiding the body to the snagged lure or the like.

U.S. Pat. No. 3,693,277 to W. N. Wells discloses a fish lure retriever comprising a plurality of weights having bores carried on a stiff wire member passing therethrough. The carrier wire passes forwardly to a member having an opening through which the fishing line extends and also through which a portion of the snagged lure is retrieved. The rear end of the wire terminates in a portion for attaching to a retriever line, and a second guide loop extends upwardly therefrom.

The retriever devices of the prior art suffer from one or more disadvantages which are overcome by the retriever device of my invention.

Thus, for example, my device provides positive locking using line tension and not solely the force of gravity. Furthermore, my device can be used vertically without difficulty, whereas others cannot.

Another advantage of my device is that it can ride over obstructions on the line such as knots and large sinkers and small lures.

With my device the harder one pulls, the firmer the device grips: my device is positively attached and cannot be dislodged by an obstruction—an advantage which is not usual with the prior art devices.

My device is also capable of recovering hooked fish.

SUMMARY OF THE INVENTION

It is a principal object of my invention to provide a fishing tackle retriever which possesses the aforementioned advantages.

The fishing tackle retriever of my invention comprises a weighted elongated body member having a forward portion and a rearward portion, an attachment member at the rearward portion thereof for connection to a retriever line, a pair of forwardly converging limbs extending from the said forward portion terminating in an upwardly directed closed loop to receive a snagged fishing line said limbs including a slot or openable means to admit said snagged line, said limbs being sufficiently spaced to permit the retriever to ride over a portion on the snagged fishing tackle whereby said loop can sit on a narrower portion of said tackle to engage the tackle on retrieval of said retriever line, a rear guide member on the upper rearward portion of said weighted body member for admitting and being guided by the snagged line, and a longitudinal groove in the weighted body, said rear guide member, said groove, and the upper portion of said closed loop all being in longitudinal alignment for close guiding by the snagged fishing line.

My tackle retriever is extremely effective in confined spaces and works well in almost all situations. Further it provides positive attachment. This is so because of its design and construction which allows the retriever to slide down the fishing line and over the extremity of the lure and attach thereto whereby the snagged lure is retrievable by pulling on a line (attached to the lure retriever) of greater tensile strength than the fishing line per se.

BRIEF DESCRIPTION OF THE SEVERAL VIEWS OF THE DRAWINGS

Other objects and advantages of the invention will become clearer when regard is had to the accompanying drawings taken in conjunction with the following description.

In the drawings

FIG. 2 is a diagrammatic view of the lure retriever of FIG. 1 approaching a snagged lure.

FIG. 3 is a similar view to FIG. 2 showing the lure retriever as it encounters the lure.

FIG. 4 is a further similar view to FIG. 2 showing the lure retriever as it becomes attached to the lure.

DETAILED DESCRIPTION

Figure 1:
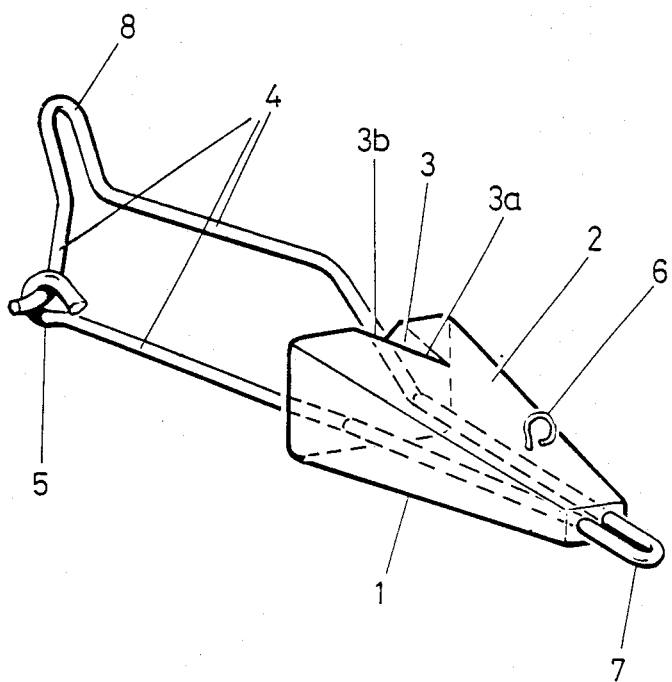
FIG. 1 is a diagrammatic view of a preferred embodiment of a lure retriever.

Now turning to FIG. 1, numeral 1 designates the retriever, which has a body portion 2. Desirably 2 is solid and composed of a metal or alloy of relatively high density. It has been found that a lead antimony alloy is a suitable material. The body portion is preferably provided with a groove 3 centrally located in a side thereof. 3b designates the front portion of the groove and 3a the point of coincidence of the groove and top of the body portion 2. The lure retriever has a forwardly converging portion constituted by limbs 4 which are provided with spring means 5 for admitting the snagged line. Alternatively in lieu of 5 a slot could be incorporated in the limbs. The forwardly converging portion terminates in an upwardly directed closed loop 8. The body portion is provided at its rear with guide means 6 for receiving the snagged line whereby the retriever may be run along the snagged line, allowed to engage and to lock on the lure. As shown the guide means may be an open wire eyelet positioned in line with groove 3 and loop 8. The retriever is also provided with rear portion 7 whereby a recovery line may be attached to lower the retriever along the snagged line and to return the retriever (together with the lure) as required.

FIGS. 2, 3 and 4 diagrammatically show the retriever in action. In FIG. 2 the snagged line 8a is supporting the retriever with attached retrieving line 11 as it approaches the snagged lure 9 and its associated snap-swivel 10 (or swivel or like attaching device). At this stage, the snagged line is supported by a loop 8 and guide 6 and generally guided in groove 3. As loop 8 touches the snagged lure (see FIG. 3) it rides upwardly and line 8a presses down on groove 3 and a downward force is in turn imparted to loop 8 which locks onto the snap swivel 10 (or like device). As shown in FIG. 4, the loop 8 has ridden over snap swivel 10, dropped, and is in a position to allow return by pulling in line 11. Where the lure is smaller than the forward portion of the retriever, loop 8 will attach to the hook at the rear of the lure.

As may be seen from FIG. 1 a single wire of suitable material (e.g. spring steel) may be used for limbs 4, spring means 5, loop 8 and retrieval attachment 7. The single wire may be formed into the appropriate shape, placed in a mould of desired shape, molten metal poured to form the body portion 2 including groove 3. Guide means 6 may be inserted at a suitable time during the casting operation or inserted by other conventional means. If necessary groove 3 may be machined.

The lure retriever may be of a suitable size and weight. Preferably it is shaped as shown in FIG. 1.

It is emphasised that my invention is to be given a broad connotation and it is not intended that it be limited to the embodiments specifically described. In this connection it is pointed out that whilst the preceding detailed description has generally been directed to a retrieval device for a lure, the scope of monopoly is not to be so restricted but is to include a retrieval device for lures, sinkers, hooks and the like.

I claim:

1. A fishing tackle retriever comprising
    a weighted elongated body member having a forward portion and a rearward portion,
    an attachment member at the rearward portion thereof for connection to a retriever line,
    a pair of forwardly converging limbs extending from the said forward portion terminating in an upwardly directed closed loop to receive a snagged fishing line, said limbs including an openable metallic spring means forming a slot to admit said snagged line, said snagged fishing line being admittable to said closed loop by means of manually springing apart two contiguous unjoined portions of one of said limbs, said limbs being sufficiently spaced to permit the retriever to ride over a portion of the snagged fishing tackle whereby said loop can sit on a narrower portion of said tackle to engage the tackle on retrieval of said retriever line,
    a rear guide member on the upper rearward portion of said weighted body member for admitting and being guided by the snagged line, and
    a longitudinal groove in the weighted body, said rear guide member, and the upper portion of said closed loop, all being in longitudinal alignment for close guiding by the snagged fishing line.

2. A fishing tackle retriever as defined in claim 1 wherein said attachment member, said limbs and said closed loop are formed of a single length of stiff wire, said elongated weighted body member being moulded thereon, to form an integral unit.

* * * * *